US006239185B1

(12) United States Patent
Braun et al.

(10) Patent No.: US 6,239,185 B1
(45) Date of Patent: May 29, 2001

(54) METHOD FOR PRODUCING EXPANDED POLYOLEFIN PARTICLES

(75) Inventors: Frank Braun, Ludwigshafen; Klaus Hahn, Kirchheim; Manfred Leibach, Ludwigshafen; Wolfram Kögel, Mannheim; Isidoor De Grave, Wachenheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/485,686

(22) PCT Filed: Aug. 20, 1998

(86) PCT No.: PCT/EP98/05295
§ 371 Date: Feb. 25, 2000
§ 102(e) Date: Feb. 25, 2000

(87) PCT Pub. No.: WO99/10419
PCT Pub. Date: Mar. 4, 1999

(30) Foreign Application Priority Data

Aug. 26, 1997 (DE) .............................. 197 37 002

(51) Int. Cl.$^7$ .................. C08J 9/18; C08J 9/228; C08J 9/22
(52) U.S. Cl. ................................. 521/60; 521/58
(58) Field of Search ........................... 521/58, 60

(56) References Cited

U.S. PATENT DOCUMENTS 4,704,239   11/1987   Yoshimura et al. .

FOREIGN PATENT DOCUMENTS 0 164 855 B1   12/1985   (EP) .
0 429 091 A2   5/1991   (EP) .

*Primary Examiner*—Morton Foelak
(74) *Attorney, Agent, or Firm*—Oblon, Spivak, McClelland, Maier & Neustadt, P.C.

(57) ABSTRACT

A process comprises producing expanded polyolefin particles by impregnating polyolefin granules with a volatile blowing agent in suspension under pressure, and then releasing the pressure. The suspension medium has a lower density than the polyolefin granules and the suspension is practically free from suspension agents.

9 Claims, No Drawings

METHOD FOR PRODUCING EXPANDED POLYOLEFIN PARTICLES

The invention relates to a process for producing expanded polyolefin (EPO) particles by impregnating polyolefin granules with a volatile blowing agent in suspension under pressure at elevated temperature.

The process mentioned is known per se and is operated on an industrial scale. According to EP-A 53 333 and EP-A 123 144, the blowing agents used are organic compounds, such as halogenated hydrocarbons, eg. dichlorodifluoromethane, or hydrocarbons, eg. butane, and the suspension medium is water. In various publications, eg. EP-A 164 855, EP-A 429 091, EP-A 464 619 and DE-A 34 31 245 it is mentioned that, besides the preferred suspension medium water, it is also possible to use mixtures of water with organic liquids, such as methanol or ethanol. However, the suspension always contains a suspension stabilizer, also called a dispersion aid. This is intended to prevent the polyolefin particles from caking or agglomerating in the suspension. Suitable suspension stabilizers are water-insoluble inorganic compounds, such as metal carbonates, metal phosphates or metal oxides, and if desired these are used together with surface-active substances, eg. sulfonates or ethoxylates. The amounts are generally from 0.1 to 10% by weight, based on the polyolefin. After the impregnation, these auxiliaries to some extent make their way into the waste water, and to some extent they also adhere to the EPO particles. So that these can be fused to give moldings, the adhering inorganic substances must be removed, and in industry this is done by means of a complicated acid wash.

It is an object of the present invention to develop a process for producing EPO particles by impregnating polyolefin granules with a blowing agent, in which no contamination of waste water occurs and no acid wash of the EPO foam particles is required.

We have found that this object is achieved if the suspension medium has a lower density than the suspended polyolefin granules.

The invention therefore provides a process for producing expanded polyolefin (EPO) particles by impregnating polyolefin granules with a volatile blowing agent in suspension under pressure at elevated temperature, followed by release of pressure, where the suspension medium has a lower density than the suspended polyolefin granules and the suspension is practically free from suspension stabilizers.

For the purposes of the present invention, polyolefins are
a) homopolypropylene,
b) random copolymers of propylene with from 0.1 to 15% by weight, preferably from 0.5 to 12% by weight, of ethylene and/or of a $C_4$–$C_{10}$ α-olefin, preferably a copolymer of propylene with from 0.5 to 6% by weight of ethylene or with from 0.5 to 15% by weight of 1-butene, or a terpolymer of propylene, from 0.5 to 6% by weight of ethylene and from 0.5 to 6% by weight of 1-butene,
c) mixtures of a) or b) with from 0.1 to 75% by weight, preferably from 3 to 50% by weight, of a polyolefin elastomer, eg. of an ethylene-propylene block copolymer having from 30 to 70% by weight of propylene,
d) polyethylene (LLDPE, LDPE, MDPE and HDPE) or
e) a mixture of the polyolefins mentioned under a) to d) (with addition of compatibilizers, if desired).

The crystalline melting point (DSC maximum) of the polyolefins listed under a) to e) is generally from 90 to 170° C. Their enthalpy of fusion, determined by DSC, is preferably from 20 to 300 J/g, the melt flow index MFI (230° C., 2.16 kp for propylene polymers and 190° C., 2.16 kp for ethylene polymers) according to DIN 53 735 from 0.1 to 100 g/10 min.

Preferred polyolefins are homo- or copolymers of propylene with up to 15% by weight of ethylene and/or 1-butene, particular preference being given to propylene-ethylene copolymers with from 1 to 5% by weight of ethylene. They have a melting point of from 130 to 160° C. and a density (at room temperature) of about 900 g/l.

The production of the EPO particles starts from polyolefin granules which preferably have an average diameter of from 0.2 to 10 mm, in particular from 0.5 to 5 mm. 100 parts by weight of these granules are dispersed in a tubular reactor in preferably from 100 to 500 parts by weight of suspension medium.

It is important that the suspension medium has a lower density than the polyolefin granules. Water is therefore not suitable.

Suitable suspension media are organic liquids with a boiling point below 300° C., preferably below 120° C., and also mixtures of these with water. To be effective as suspension medium, the liquids or the mixtures with water may not dissolve the polyolefin granules, even at the impregnation temperature. The liquids are preferably miscible with water.

Suitable organic liquids are alcohols, in particular $C_1$–$C_4$ alcohols, and ketones, ethers, aldehydes and esters. Particular preference is given to mixtures of ethanol with from 0 to 50% by weight of water. These have a density (at room temperature) of between 790 and 910 g/l.

It is moreover important that the suspension is practically free from suspension stabilizers. Practically free means that any dispersion aids, eg. water-insoluble inorganic compounds, should be present in amounts of less than 0.01% by weight, preferably of less than 0.005% by weight, and in particular of less than 0.001% by weight, based on the polymer granules. It is particularly preferable if the suspension contains no stabilizers at all.

The blowing agents used are either organic liquids or inorganic gases or mixtures of these. Possible liquids are halogenated hydrocarbons, but preference is given to saturated aliphatic hydrocarbons, in particular those having from 3 to 8 carbon atoms. n-Butane is particularly preferred. Suitable inorganic gases are nitrogen, air, ammonia and carbon dioxide.

The blowing agent is used in amounts of preferably from 0.1 to 60 parts by weight, in particular from 3 to 50 parts by weight, based on 100 parts by weight of polymer. The addition of blowing agent here may take place before or during the heating of the reactor contents.

During impregnation, the temperature should be above the softening point of the polyolefin. It may be from 40° C. below to 25° C. above the melting point (crystalline melting point), but should preferably be below the melting point.

Depending on the amount and type of the blowing agent, and also on the elevation of temperature, a pressure of generally higher than 2 bar and not exceeding 40 bar becomes established in the reactor. In the case of the preferred suspension medium ethanol, it is from 8 to 30 bar.

The bulk density of the resultant EPO particles may be controlled by the selection of impregnation temperature and of blowing agent. After the temperature for pressure release has been reached, the pressure in the reactor is released, the release of pressure expediently taking place into an intermediate vessel in which the pressure is from preferably 0.5 to 5 bar.

When the pressure in the reactor is released, the polyolefin granules containing blowing agent expand and EPO particles are produced with an average diameter of from 1 to 20 mm. These particles are then separated off from the suspension medium and are dried without further treatment.

The bulk density of the EPO particles may be adjusted within wide limits from 10 to 300 g/l, preferably from 15 to 200 g/l. The EPO particles are predominantly of closed-cell type, and have a cell count of from 1 to 5000 cells/mm$^2$, preferably from 2 to 3000 cells/mm$^2$, in particular from 10 to 1500 cells/mm$^2$.

A further advantage of the novel process is that the suspension medium is free from additives, so that it may be used again directly in the next impregnation batch after the EPO particles have been separated off.

EXAMPLE 1

60 parts by weight of a random propylene-ethylene copolymer (density 910 g/l) having an ethylene content of about 2% by weight is dispersed in a closed reactor equipped with stirrer in a mixture consisting of 108 parts by weight of ethanol and 32 parts by weight of water (density 850 g/l). After introduction of nitrogen at a pressure of 10 bar, the reactor contents are heated to 144° C. During this, the pressure in the reactor rises to about 19 bar. The reactor contents are then released from pressure through a basal valve into an intermediate vessel. The resultant expanded particles, after decanting and drying, have a bulk density of 183 g/l. The suspension medium separated off was reused in a subsequent impregnation mixture.

EXAMPLE 2

60 parts by weight of a random propylene-ethylene copolymer having an ethylene content of about 2% by weight is dispersed in a closed reactor equipped with stirrer in a mixture consisting of 97 parts by weight of ethanol and 28 parts by weight of water. After this, 9 parts by weight of butane are introduced, and the reactor contents are heated to 135° C. During this, the pressure in the reactor rises to about 18 bar. The reactor contents are then released from pressure through a basal valve into an intermediate vessel. The resultant expanded particles, after drying have a bulk density of 87 g/l.

EXAMPLE 3

60 parts of a propylene-ethylene copolymer with an ethylene content of 2% are dispersed in 130 parts of ethanol in a closed reactor equipped with stirrer. After addition of 19 parts of butane, the reactor contents are heated to 130.5° C., whereupon the pressure rises to 24.3 bar. After release of the pressure, decanting and drying, the resultant foam particles have a bulk density of 50 g/l.

Comparative Example

The method was as in Example 3, but 165 parts of water were used as suspension medium. The mixture coagulated, and no individual foam beads were obtained.

What is claimed is:

1. A process for producing expanded polyolefin (EPO) particles by impregnating polyolefin granules with a volatile blowing agent in suspension under pressure at elevated temperature and then releasing the pressure, wherein the suspension medium is ethanol or a mixture of ethanol and water containing up to 50% by weight water, said medium having a lower density than the suspended polyolefin granules and less than 0.01% by weight, based on the polyolefin granules, of suspension stabilizers.

2. A process as claimed in claim 1, wherein the polyolefin is a homo- or copolymer of propylene with up to 15% by weight of ethylene and/or 1-butene.

3. A process as claimed in claim 1, wherein the impregnation is carried out at above the softening point, but below the melting point, of the polyolefin.

4. A process as claimed in claim 1, wherein the blowing agent is a saturated aliphatic hydrocarbon having from 3 to 8 carbon atoms.

5. A process as claimed in claim 1, wherein the blowing agent is nitrogen, air, ammonia or carbon dioxide, alone or in a mixture with a saturated aliphatic hydrocarbon having from 3 to 8 carbon atoms.

6. A process as claimed in claim 1, wherein, after impregnation and pressure release, the EPO particles are separated off from the suspension medium and the separated medium is used for a further impregnation batch.

7. A process as claimed in claim 1, wherein said suspension medium comprises less than 0.001% by weight suspension stabilizers.

8. A process as claimed in claim 1, wherein said suspension medium comprises no suspension stabilizers.

9. A method for producing a foam molding, comprising molding EPO particles obtained by impregnating polyolefin granules with a volatile blowing agent in suspension under pressure at elevated temperature and then releasing the pressure, wherein the suspension medium is ethanol or a mixture of ethanol and water containing up to 50% by weight water, said medium having a lower density than the suspended polyolefin granules and less than 0.01% by weight, based on the polyolefin granules, of suspension stabilizers.

* * * * *